US007072546B2

(12) United States Patent
Nikonov et al.

(10) Patent No.: US 7,072,546 B2
(45) Date of Patent: Jul. 4, 2006

(54) COMPENSATION FOR CHROMATIC DISPERSION

(75) Inventors: Dmitri E. Nikonov, San Jose, CA (US); Thomas G. Willis, Portland, OR (US); Anders Grunnet-Jepsen, San Jose, CA (US); Atul A. Tambe, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 300 days.

(21) Appl. No.: 10/393,570

(22) Filed: Mar. 21, 2003

(65) Prior Publication Data

US 2004/0184730 A1    Sep. 23, 2004

(51) Int. Cl.
*G02B 6/34* (2006.01)
*G02B 6/12* (2006.01)
*G02B 6/26* (2006.01)
*G02B 6/10* (2006.01)
*G02B 6/28* (2006.01)

(52) U.S. Cl. .............................. 385/37; 385/14; 385/24; 385/27; 385/129

(58) Field of Classification Search .................. 385/24, 385/27, 37, 130, 14, 129; 398/180, 87
See application file for complete search history.

(56) References Cited

U.S. PATENT DOCUMENTS

| 6,281,997 | B1 * | 8/2001 | Alexander et al. | ............ 398/87 |
| 6,519,390 | B1 * | 2/2003 | Fells et al. | ..................... 385/37 |
| 6,668,139 | B1 * | 12/2003 | Meli et al. | ................... 398/173 |
| 6,813,447 | B1 * | 11/2004 | Ellis et al. | ................... 398/155 |
| 6,819,845 | B1 * | 11/2004 | Lee et al. | .................... 385/122 |
| 2002/0018265 | A1 * | 2/2002 | Graves | ........................ 359/128 |
| 2002/0186929 | A1 * | 12/2002 | Matsuoka et al. | ............ 385/37 |

* cited by examiner

*Primary Examiner*—Frank G. Font
*Assistant Examiner*—Michael P. Mooney
(74) *Attorney, Agent, or Firm*—Trop, Pruner & Hu, P.C.

(57) ABSTRACT

A plurality of channels of a wavelength division multiplexing system may be subjected to dispersion compensation in a fashion which enables tuning of the compensation for each individual wavelength channel. Moreover, the tuning may be done in a space-efficient fashion. The chirped Bragg gratings may be formed, for example, on a planar light circuit. Each grating may be heated to controllably adjust its dispersion compensation, in one embodiment of the present invention.

18 Claims, 2 Drawing Sheets

COMPENSATION FOR CHROMATIC DISPERSION

BACKGROUND

This invention relates generally to optical communication networks.

Optical communication networks may be subject to chromatic dispersion, which is the dependence of the refractive index of a transmission medium on the wavelength of light traveling through the medium. Thus, dispersion corresponds to a change of the light velocity in a waveguide or a medium, depending on its wavelength. An optical network's dispersion dependence on wavelength results in pulse spread. Dispersion restricts the information carrying capacity of a waveguide since, the wider the pulse, the fewer pulses that can be accommodated per interval, resulting in a smaller bit rate.

There are a number of different ways to compensate for chromatic dispersion. A long length of specialty optical fiber with a fixed negative dispersion coefficient can be used. This method may provide good compensation, but it is fairly lossy and relatively bulky, since the fiber spool may be from 10 to 20 kilometers. Also, the use of the specialty optical fiber provides no tunability to the dispersion compensation.

Another approach is to use a chirped fiber Bragg grating. A fiber Bragg grating includes a structure whose refractive index periodically changes in value as a function of position in the structure. A small portion of the overall light may be reflected at each refractive index change. For a wavelength of light satisfying the Bragg condition, the refracted portions interfere constructively to produce high reflection.

In a chirped fiber Bragg grating, the optical grating period changes linearly over the length of the grating. Thus, a chirped fiber Bragg grating reflects a set of wavelengths. An input pulse may be directed to a chirped fiber Bragg grating. The shorter wavelengths are reflected sooner in the grating, while the longer wavelengths penetrate deeper into the grating before reflecting. Thus, the shorter wavelengths have less delay than the longer wavelengths and this exactly compensates for the delay introduced by previous propagation in a fiber.

However, the use of chirped fiber Bragg gratings is also disadvantageous in some respects. Generally to introduce a chromatic dispersion of, for example 850 ps/nm, the grating length will depend on the device bandwidth and, for the C band, which is approximately 30 nanometers, the required length is approximately 2.6 meters. This length of fiber Bragg grating is difficult to fabricate with high quality and it is difficult to package. Furthermore, channel dispersion cannot be individually tuned, for example to compensate the second or third order dispersion of the transmission fiber.

Thus, there is a need for an improved dispersion compensator.

DETAILED DESCRIPTION

As the transmission speed of telecommunication networks has steadily increased, compensating the chromatic dispersion that data signals experience during transmission through optical fibers and other optical components has become an increasingly important issue. Chromatic dispersion has a direct impact on how far signals can be transmitted without error, with transmission distance scaling inversely with the square of transmission bandwidth. It has long been recognized that there will be an increasingly strong need for devices that can flexibly and accurately compensate for this chromatic dispersion.

Figure 1:
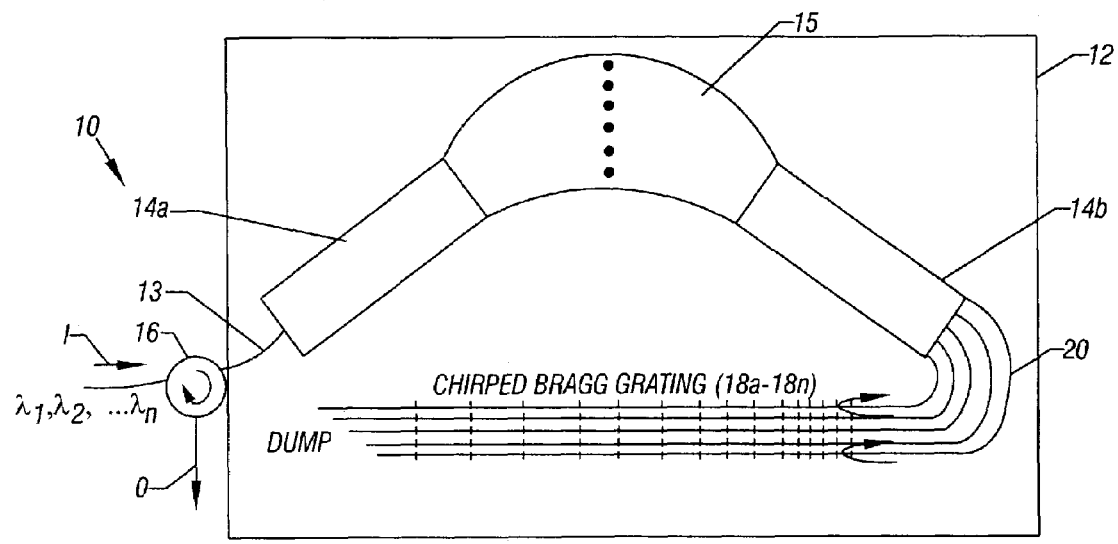
FIG. 1 is a schematic depiction of one embodiment of the present invention.

Referring to FIG. 1, a planar light circuit may be formed on a substrate 12 using conventional semiconductor fabrication techniques. An arrayed waveguide 10 may include an input waveguide 13, an input star coupler 14a, a waveguide region 15, an output star coupler 14b, and an output waveguide 20. The output waveguide 20 may be connected to a chirped Bragg grating 18 formed on the substrate 12. The arrayed waveguide 10 may in turn be coupled to a circulator 16 that receives an input signal I and provides an output signal O. As indicated, the input signal I includes a plurality of channels, each of a different wavelength as part of a wavelength division multiplexed optical network.

While an embodiment using an arrayed waveguide is illustrated, any optical demultiplexer may be suitable in some embodiments of the present invention. Examples of other suitable demultiplexers include planar waveguides such as Fourier filters, echelle gratings, and Bragg gratings, as well as fiber-connected demultiplexers including thin-film filters and bulk holographic demultiplexers. The demultiplexer, be it an arrayed waveguide 10 or other demultiplexing device, separates the multiplexed wavelength channels into different channels, each of a different wavelength.

By writing chirped Bragg gratings 18 into each of these waveguides 20, it is possible to compensate individually for the dispersion of each wavelength channel. The retroreflected signal, indicated by the two arrows on the chirped Bragg gratings 18, subsequently passes back through the arrayed waveguide 10 and exits backwardly out of the input fiber. Here, the retroreflected signal can be separated from the input signal using the optical circulator 16 to generate the output signal O.

Figure 2:
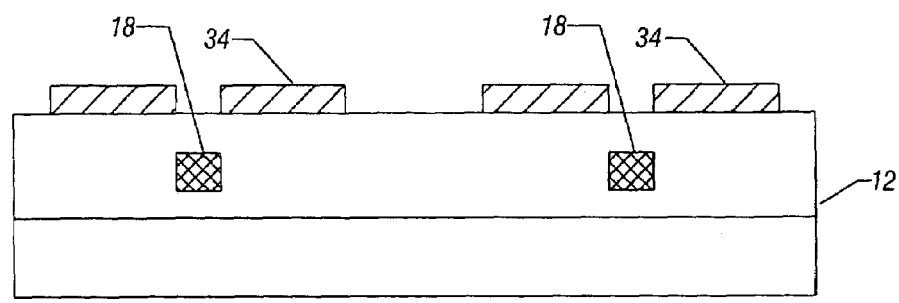
FIG. 2 is a greatly enlarged, cross-sectional view of a Bragg grating of FIG. 1 in accordance with one embodiment of the present invention.

Referring to FIG. 2, a Bragg grating 18 in a substrate 12 may have an overlying heater 34 in one embodiment of the present invention. Each grating 18 may be heated individually, for example using deposited micro-heaters 34 in one embodiment. A variable heating profile may be used in one embodiment. The micro-heaters 34 provide localized electrical resistance heating. By controlling the heating of the grating 18 for a particular channel, the extent of dispersion compensation can be controlled by effectively tuning wavelength that is reflected, or even controlling the profile of chirp by a variable heater profile.

The Bragg gratings 18 may be formed on a solid state chip using silica, silicon, indium phosphide, or silicon oxynitride, to mention a few examples. The chip may also contain an optical demultiplexer, such as the waveguide 10, that separates the wavelength communication channels into separate straight waveguide sections.

The waveguide sections each contain Bragg gratings 18, formed, for example, by lithography or by ultraviolet (UV) laser exposure, with each Bragg grating 18 acting to reflect light back through the arrayed waveguide 10 or other demultiplexer. This retroreflection results in recombining all the optical channels to propagate backwardly out the input channel where an optical circulator 16 separates the retroreflected light into an output.

The gratings 18 impose predetermined optical transfer functions on the individual channels to, for example, impose chromatic dispersion on each channel that counterbalances the chromatic dispersion that the light signal experiences upon propagation through a predetermined length of optical fiber. The transfer functions are tunable through, for example, heating or cooling of the Bragg gratings 18 to, for example, change the chromatic dispersion experienced by the individual channels. Thus, an arbitrary desired dependence of a phase delay on wavelength may be provided for any purpose, not just to compensate dispersion accumulated in a fiber.

The gratings 18 impose a periodic perturbation that causes wavelength selective reflection. The wavelengths that are resonant with the period of the perturbation are reflected strongly from the grating 18. Non-resonant wavelengths get transmitted. The resonant wavelength may be controlled by changing the average index of refraction of the waveguide. Heating or cooling may be used to change the average index of refraction of each grating 18. A phase-shift is induced in the reflected light. The reflected light is multiplexed in the waveguide 10 so that the circulator 16 outputs the reflected, phase-shifted light.

By directing the separated wavelengths to chirped Bragg gratings, chromatic dispersion may be corrected on a channel-by-channel basis in some embodiments. This enables the process to be run in parallel for each channel, reducing the length of Bragg grating needed in some cases to be a few centimeter. The dispersion for each channel can then be individually tuned. This individual tuning can be done by using, for example, thermal gradients across the gratings or by using non-linearly chirped gratings that are heated or cooled to change the effective dispersion slope at a central wavelength.

The Bragg gratings can have spectra that straddle into the wavelength corresponding to neighboring channels in some embodiments. This straddling need not affect neighboring channels because those channels have been previously separated. This insensitivity of adjacent channels is important because dispersion compensating gratings generally perform best when they have spectral bandwidths that are much greater than the bandwidth within which they are supposed to compensate. Moreover, a non-linear grating used for dispersion compensation can be shifted in center wavelength without the danger of affecting neighboring channels.

In some embodiments, channels are not adversely affected by having to pass through high reflection gratings, as they can be for the case of a single long grating or a concatenated chain of Bragg gratings. Strongly reflecting Bragg gratings can, in transmission, have such adverse features as cladding mode losses at shorter wavelengths, or extra chromatic dispersion in neighboring wavelengths. In some embodiments, the dispersion compensation can be done at relatively small dimensions suitable for semiconductor fabrication environments.

Figure 3:
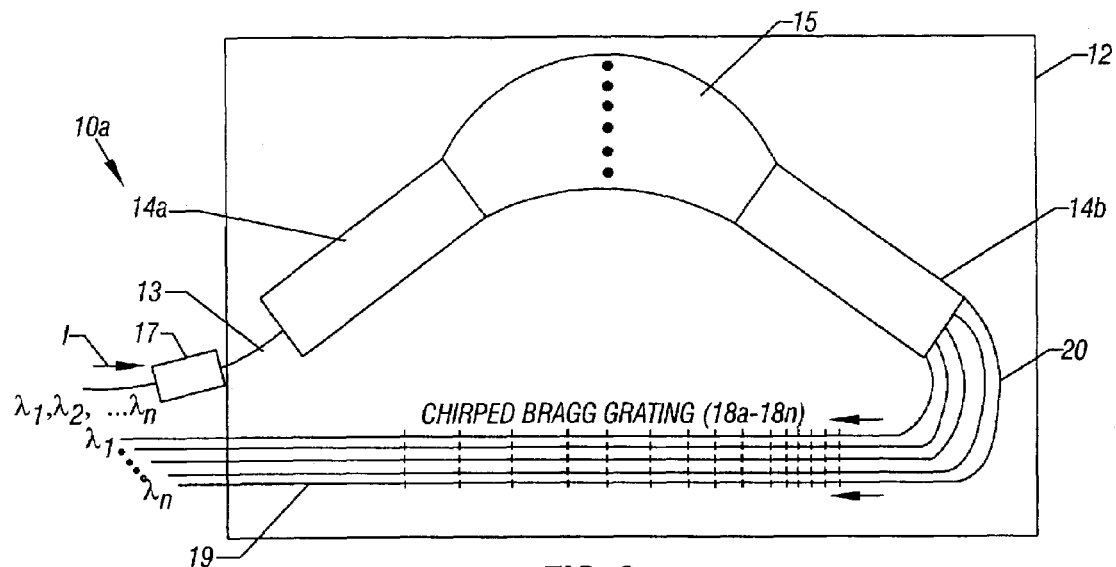
FIG. 3 is a schematic depiction of another embodiment of the present invention.

Referring to FIG. 3, in accordance with another embodiment of the present invention, a dispersion compensation system 10a may be operated in transmission, rather than in reflection, as is the case with the waveguide 10. Thus, the integrated device may include outputs 19 which may be connected to output optical fibers.

However, in the embodiment of FIG. 3, the retro-reflected optical signals still exit through the input waveguide 13 are of no interest and may need to be dumped so they do not perturb the optical network. This can be done by placing an isolator 17 on the input waveguide 13.

Thus the roles of inputs and outputs are reversed between embodiments of FIG. 1 and FIG. 3.

In FIG. 1, outputs from the chirped Bragg gratings 18a–18n, which are the wavelengths transmitted through the gratings 18, are the wavelengths that are not of interest and may be dumped. In FIG. 3, in a transmission mode, the wavelengths $\lambda_i$ through $\lambda_n$ are the dispersion compensated wavelengths of interest. These wavelengths $\lambda_i$ through $\lambda_n$ may then be used without re-multiplexing in some embodiments. Particularly in the case of a multi-channel optical receiver, where it is desired to demultiplex and dispersion compensate at the same time, the wavelengths outputted from the Bragg gratings 18a–18n, in FIG. 3, are ready for detection on a channel-by-channel basis.

In one embodiment, a resonant peak of the Bragg grating is in a vicinity of the wavelength to be compensated in transmission. As a result, the reflection is weak at the compensated wavelength while sufficient phase variation ensured dispersion compensation.

In one embodiment, the Bragg gratings 18 may be set to have two resonance peaks surrounding the compensated wavelength. Light of a wavelength between the peaks is transmitted while light outside the transmission band is filtered by retroreflection. The filtering power affecting the dispersion compensated light may be adjusted.

The added benefit of the Bragg grating is additional filtering of other wavelength channels. It may result, in some embodiments, in improved cross-talk of the overall device compared to a standalone multiplexer.

Figure 4:
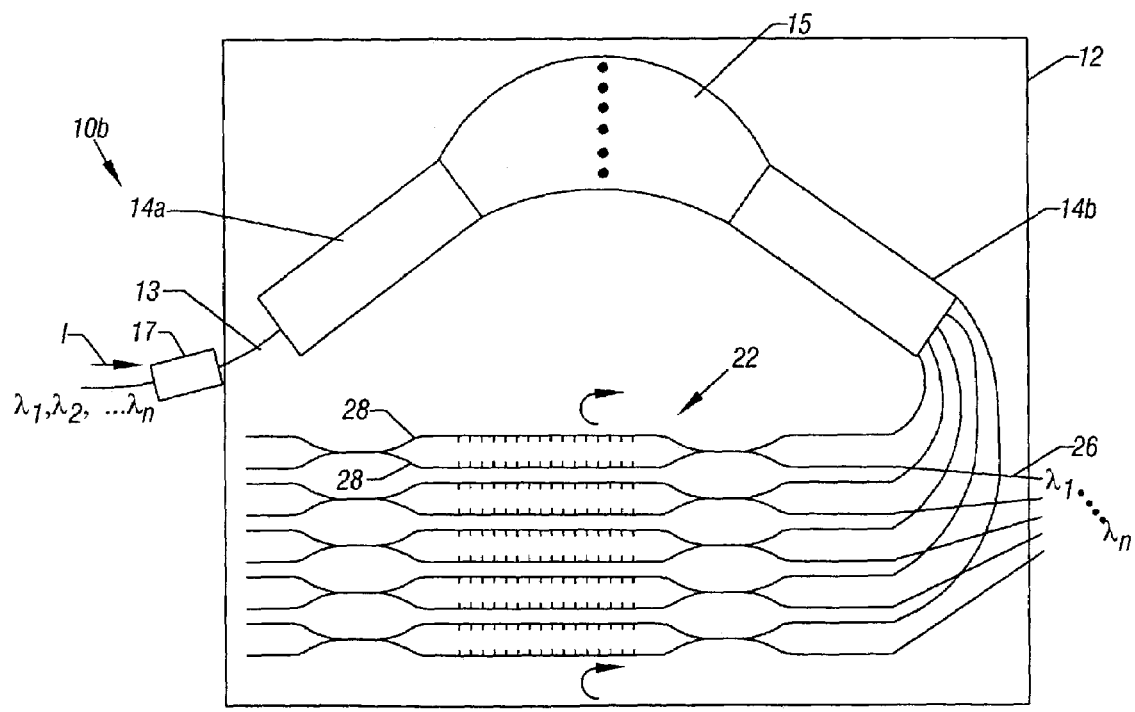
FIG. 4 is a schematic depiction of yet another embodiment of the present invention.

An embodiment, shown in FIG. 4, is also designed for direct demultiplexed dispersion compensated channels to a set of outputs 26. This embodiment may still rely on reflection from Bragg gratings 24 in a manner similar to the embodiment of FIG. 1. The retroreflected light may be directed away from the multiplexer and into separate output waveguides using Mach-Zehnder interferemeters 22. Nominally identical Bragg gratings 24 may be formed in each arm 28 of a Mach-Zehnder interferometer 22.

An embodiment creating demultiplexed outputs may have advantages in some situations because it is not necessary to pass the desired output wavelengths back through the arrayed waveguide. The retransmission through the arrayed waveguide and the resulting re-multiplexing may result in additional loss of the signal's optical power.

The present invention is applicable to devices involving any type of waveguide, including planar and fiber waveguides.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    demultiplexing two channels in a multiplexer;
    providing different dispersion compensation to each channel using a heated Bragg grating on each channel and heating said gratings differently to provide different dispersion compensation to each channel; and
    reflecting the dispersion compensated signals back through the demultiplexer.

2. The method of claim 1 including multiplexing said channels after providing different dispersion compensation to each of said channels.

3. The method of claim 1 including demultiplexing using a planar waveguide demultiplexer.

4. The method of claim 1 where the heating profile is variable.

5. The method of claim 1 including providing a planar waveguide to dispersion compensate and demultiplex the two channels.

6. The method of claim 1 including extracting the compensated signals, after being multiplexed, from a circulator.

7. The method of claim 1 including transmitting light of a dispersion compensated wavelength through a Bragg grating.

8. An optical device comprising:
   a demultiplexer to demultiplex a multiple channel signal into at least two channels, said demultiplexer being a planar light circuit;
   a planar Bragg grating optically coupled to each of said channels to provide different dispersion compensation to each of said channels;
   a heater to control the average index of refraction of at least one of said Bragg gratings; and
   wherein said planar light circuit is an arrayed waveguide which demultiplexes said signal passing in one direction and re-multiplexes signals reflected from said Bragg gratings.

9. The device of claim 8 including a heater with a variable profile on each of said Bragg gratings.

10. The device of claim 8 including a circulator attached to the input to said demultiplexer.

11. The device of claim 8 wherein said planar light circuit includes an arrayed waveguide grating.

12. The device of claim 8 wherein at least one of said Bragg gratings reflects a dispersion compensated wavelength.

13. The device of claim 8 wherein at least one of said Bragg gratings passes a dispersion compensated wavelength.

14. The device of claim 12 where the light from said Bragg grating is directed to separate outputs.

15. The device of claim 14 wherein Bragg gratings are formed in each arm of an interferometer.

16. An optical device comprising:
   a demultiplexer to demultiplex a multiple channel signal into at least two channels, said demultiplexer being a planar light circuit;
   a planar Bragg grating optically coupled to each of said channels to provide different dispersion compensation to each of said channels;
   a heater to control the average index of refraction of at least one of said Bragg gratings; and
   wherein Bragg gratings are formed in each arm of an interferometer.

17. The device of claim 16 wherein at least one of said Bragg gratings reflects a dispersion compensated wavelength.

18. The device of claim 17 where the light from said Bragg grating is directed to separate outputs.

* * * * *